United States Patent
Wilhelmsson

(10) Patent No.: US 8,050,338 B2
(45) Date of Patent: Nov. 1, 2011

(54) DOPPLER DEPENDENT POWER CONTROL AND SUB-CARRIER ALLOCATION IN OFDM MULTIPLE ACCESS SYSTEMS

(75) Inventor: Leif Wilhelmsson, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 973 days.

(21) Appl. No.: 11/915,445

(22) PCT Filed: May 31, 2006

(86) PCT No.: PCT/EP2006/005190
§ 371 (c)(1), (2), (4) Date: Nov. 26, 2007

(87) PCT Pub. No.: WO2006/131250
PCT Pub. Date: Dec. 14, 2006

(65) Prior Publication Data
US 2008/0212697 A1    Sep. 4, 2008

Related U.S. Application Data

(60) Provisional application No. 60/688,718, filed on Jun. 9, 2005.

(51) Int. Cl.
*H04K 1/10* (2006.01)
*H04L 27/28* (2006.01)

(52) U.S. Cl. ........ 375/260; 375/267; 370/203; 370/204; 370/208; 342/171

(58) Field of Classification Search .................. 375/260, 375/267; 370/203–211; 342/171
See application file for complete search history.

(56) References Cited

U.S. PATENT DOCUMENTS

2002/0067702 A1 * 6/2002 Imura ........................... 370/318
2005/0180313 A1 * 8/2005 Kim et al. ..................... 370/208

* cited by examiner

*Primary Examiner* — Curtis Odom

(57) ABSTRACT

Digital data Symbols from a transceiver are transmitted to at least two remote transceivers in a wireless Communications System employing Orthogonal Frequency Division Multiplexing, wherein a number of available sub-carriers are shared between said remote transceivers. Information about magnitudes of Doppler effect experienced by the remote transceivers is provided; sub-carriers are allocated to each remote transceiver in dependence of the information about magnitudes of Doppler effect; and a power level transmitted to each of said remote transceivers is controlled in dependence of the Information about magnitudes of Doppler effect. In this way the reception of OFDM Signals for transceivers moving at high speed and thus experiencing a high Doppler effect is improved without degrading the reception quality for transceivers with low or no Doppler effect. Thus the Performance of a System based on OFDM and multiple access is improved.

18 Claims, 9 Drawing Sheets

DOPPLER DEPENDENT POWER CONTROL AND SUB-CARRIER ALLOCATION IN OFDM MULTIPLE ACCESS SYSTEMS

This application claims the benefit of U.S. Provisional Application Ser. No. 60/688718 filed Jun. 9, 2005, and International Application Ser. No. PCT/EP2006/005190 filed May 31, 2006, the disclosures of which are fully incorporated herein by reference.

TECHNICAL FIELD OF THE INVENTION

The invention relates to a method of transmitting digital data symbols from a transceiver to at least two remote transceivers in a wireless communications system, said transmission employing Orthogonal Frequency Division Multiplexing, wherein a number of available sub-carriers are shared between said remote transceivers. The invention further relates to a transceiver for transmitting digital data symbols to at least two remote transceivers in a wireless communications system, and to a corresponding computer program and computer readable medium.

DESCRIPTION OF RELATED ART

Several wireless applications, such as multimedia applications, video and radio broadcasting, mobile communication, etc., have an ever increasing demand for broadband communication methods. Orthogonal Frequency Division Multiplexing (OFDM) is a promising access technique for several of these high-rate wireless applications. It allows the transmission of high data rates over highly time-dispersive channels at a comparable low complexity, and it has been chosen as the transmission method for different flavours of Wireless Local Area Networks (WLAN), different standards for Digital Video Broadcasting, like DVB-T and DVB-H, and Digital Audio Broadcasting, such as DAB. Further, the Third Generation Partnership Project (3GPP) is considering OFDM as a promising radio-access technology for the long-term evolution of third-generation mobile systems (3G), which is planned to ensure the long-term competitiveness of the 3G standard. This long-term evolution is also sometimes called Super 3G. OFDM may also be considered as a radio-access technology for fourth-generation mobile systems (4G).

One advantage of using OFDM compared to other techniques is obtained when the channel is highly frequency selective. For single carrier techniques, a highly frequency selective channel usually implies that a very complex channel equalizer is needed in order to get reliable communications. For a system based on OFDM, which is a multicarrier system, this is avoided by transmitting the information on many orthogonal sub-carriers. In a multicarrier system the symbol rate on each sub-carrier can be lower and the resulting longer symbol duration makes it easier to offer higher immunity against multipath dispersion. Further, to make it easier to compensate the effects of a multipath channel, the OFDM symbols are artificially prolonged by adding a so-called cyclic prefix (CP), also known as a guard interval (GI), to each symbol. When the length of this guard interval is longer than the maximum channel delay spread, all reflections of previous symbols can be removed.

Critical for an OFDM system to work properly is that the orthogonality between the sub-carriers is maintained. If this is not achieved, then the performance is degraded considerably. There are different reasons why orthogonality between the sub-carriers might be lost, e.g., frequency error, time-drift, phase noise, and perhaps most importantly Doppler spread. Doppler spread is experienced e.g. when the receiver is moving and the received signal consists of several paths, each arriving at different angles.

The number of sub-carriers in an OFDM system is a trade-off between ability to handle large delay spread and ability of work well at high Doppler levels. When a high number of sub-carriers are employed, the duration of the useful part of the OFDM symbol will be large, and therefore a large guard interval can be used without causing too much overhead. On the other hand, in that case the sub-carrier spacing is decreased, and by that the system becomes more sensitive to especially the Doppler effect.

The problem with the Doppler effect is mainly due to inter-carrier interference (ICI). This means that information from one sub-carrier leaks over to the neighbouring sub-carriers. The effect of ICI is essentially that the interference will cause a noise-floor. Therefore, if the Doppler level is high, a more robust modulation scheme must be used so that the effective throughput is decreased, or some kind of ICI cancellation must be implemented in the receiver, which means that the complexity of the receiver is substantially increased.

If the orthogonality between the sub-carriers is maintained, and the channel is changing slowly enough so that channel knowledge is available in the transmitter, it is possible to use a larger modulation alphabet on those sub-carriers where the signal-to-noise-ratio (SNR) is large and a more robust (smaller) modulation alphabet on those sub-carriers where the SNR is small. This way of using the channel is often referred to as water-filling or bit-loading. When OFDM is used for multiple-access, i.e. when the transmitted signals are intended for a number of different receivers, an idea similar to the bit-loading can also be applied, namely by allocating the different sub-carriers to the users depending on what the channel for the different users look like at different sub-carriers. Although this approach might give good results, it is rather complex and it means that the channel must be accurately known. Especially the latter might impose a problem in case the channel is rapidly changing. Also, not only is the Doppler effect a problem because it becomes harder to estimate what the channel looks like, it is also a problem that affects the performance because of the above mentioned leakage from one sub-carrier to the neighbouring sub-carriers.

A problem with the described solution is that the number of sub-carriers as mentioned is a trade-off between ability to handle delay spread and high Doppler levels. This trade-off cannot be made user-by-user but must me made for the "worst case" situation when many users are present. This means that if users are very differently affected by the Doppler effect, this cannot be effectively exploited. In addition, it appears as bit-loading type of algorithms for multiple-access are based on what the channel looks like, not taking into account that some users due to high Doppler levels might have poor performance in spite of a very good channel.

"A New Transmission and Multiple Access Scheme based on Multicarrier CDMA for Future Highly Mobile Networks", Luis Loyola et al., 14th IEEE 2003 International Symposium on Personal, Indoor and Mobile Radio Communication Proceedings, ISBN 0-7803-7822-9 discloses a multicarrier DSCDMA (Direct Sequence Code Division Multiple Access) system, in which mobile users are divided into three mobility classes for low, medium and high speed users. Medium and high speed users are allocated sub-carriers that are not consecutive, and to reduce inter-carrier interference further, different users are assigned different spreading codes. This method, however, is not suitable for a plain OFDM system.

Therefore, it is an object of the invention to provide a method that improves the reception of OFDM signals for transceivers moving at high speed and thus experiencing a high Doppler effect without degrading the reception quality for transceivers with low or no Doppler effect.

SUMMARY

According to the invention the object is achieved in that the method comprises the steps of providing information about magnitudes of Doppler effect experienced by said remote transceivers; allocating sub-carriers to each remote transceiver in dependence of said information about magnitudes of Doppler effect; and controlling a power level transmitted to each of said remote transceivers in dependence of said information about magnitudes of Doppler effect.

When the sub-carriers are allocated to the remote transceivers in dependence of the Doppler effect experienced by the individual transceivers it is possible to allocate the sub-carriers in such a way that self interference caused by the experienced Doppler effect between sub-carriers belonging to the same transceiver can be reduced. When further the power level to each transceiver is controlled in dependence of the Doppler effect experienced by the transceivers, a higher power level can be transmitted to transceivers with high Doppler levels. This improves the signal-to-interference ratio for these transceivers without corresponding negative effects for transceivers experiencing lower Doppler levels. Thus the performance of a system based on OFDM and multiple access is improved.

When the step of allocating sub-carriers comprises the step of separating at least sub-carriers allocated to a remote transceiver for which a relatively high magnitude of Doppler effect is experienced by at least one sub-carrier allocated to a remote transceiver for which a lower magnitude of Doppler effect is experienced, it is ensured that the inter-carrier interference between the sub-carriers of a transceiver with high Doppler levels is reduced, since they are separated in frequency.

In some embodiments, the step of allocating sub-carriers comprises the steps of allocating sub-carriers to the remote transceiver for which the highest magnitude of Doppler effect is experienced; allocating sub-carriers to the remote transceiver for which the second highest magnitude of Doppler effect is experienced; and allocating repeatedly sub-carriers to the remote transceiver for which the next highest magnitude of Doppler effect is experienced, until all sub-carriers have been allocated. This is an efficient way of allocating the sub-carriers, since transceivers having the worst Doppler conditions are allocated sub-carriers first.

In some embodiments, the step of allocating sub-carriers comprises the step of separating sub-carriers for each remote transceiver as much as possible, so that the self-interference is minimized. Alternatively, the step of allocating sub-carriers may comprise the step of separating sub-carriers for each remote transceiver to an extent where an amount of self interference for that receiver is kept below a predefined limit. In this way the self-interference is attenuated sufficiently, but not more. In other embodiments, the step of allocating sub-carriers comprises the steps of dividing remote transceivers into a first group of remote transceivers experiencing relatively high magnitudes of Doppler effect and a second group of remote transceivers experiencing relatively low magnitudes of Doppler effect; and interlacing sub-carriers allocated to remote transceivers in said first group with sub-carriers allocated to remote transceivers in said second group.

The step of controlling power levels may comprise the steps of estimating from said information about magnitudes of Doppler effect a level of inter-carrier interference experienced by each remote transceiver; estimating from said estimated levels of inter-carrier interference a signal-to-noise ratio for each remote transceiver; and updating said power level transmitted to each remote transceiver in dependence of said estimated signal-to-noise ratios. In this case, the step of updating power levels may comprise the step of increasing the power level transmitted to remote transceivers for which said estimated signal-to-noise ratio is below a predefined reference value.

In some embodiments, the step of providing information about magnitudes of Doppler effect comprises the step of estimating in the transceiver said magnitudes from digital data symbols received from said remote transceivers. When the Doppler magnitudes are estimated in the transceiver transmitting the digital data symbols, there is no need for this information to be transmitted from the remote transceivers. This principle makes use of the fact that the relative speed between the two transceivers is reciprocal, although the channel might not be, because the uplink and downlink transmissions might be on different frequencies. Alternatively, the step of providing information about magnitudes of Doppler effect comprises the step of receiving said information from said remote transceivers.

As mentioned, the invention also relates to a transceiver for transmitting digital data symbols to at least two remote transceivers in a wireless communications system, said transceiver employing Orthogonal Frequency Division Multiplexing, wherein a number of available sub-carriers are shared between said remote transceivers. When the transceiver comprises circuitry for providing information about magnitudes of Doppler effect experienced by said remote transceivers; an allocating unit for allocating sub-carriers to each remote transceiver in dependence of said information about magnitudes of Doppler effect; and a power controller for controlling a power level transmitted to each of said remote transceivers in dependence of said information about magnitudes of Doppler effect, a transceiver that improves the performance of a system based on OFDM and multiple access is achieved.

When the allocating unit is arranged to separate at least sub-carriers allocated to a remote transceiver for which a relatively high magnitude of Doppler effect is experienced by at least one sub-carrier allocated to a remote transceiver for which a lower magnitude of Doppler effect is experienced, it is ensured that the inter-carrier interference between the sub-carriers of a transceiver with high Doppler levels is reduced, since they are separated in frequency.

In some embodiments, the allocating unit is arranged to allocate sub-carriers to the remote transceiver for which the highest magnitude of Doppler effect is experienced; allocate sub-carriers to the remote transceiver for which the second highest magnitude of Doppler effect is experienced; and allocate repeatedly sub-carriers to the remote transceiver for which the next highest magnitude of Doppler effect is experienced, until all sub-carriers have been allocated. This is an efficient way of allocating the sub-carriers, since transceivers having the worst Doppler conditions are allocated sub-carriers first.

In some embodiments, the allocating unit is arranged to separate sub-carriers for each remote transceiver as much as possible, so that the self-interference is minimized. Alternatively, the allocating unit may be arranged to separate sub-carriers for each remote transceiver to an extent where an amount of self interference for that receiver is kept below a predefined limit. In this way the self-interference is attenuated sufficiently, but not more. In other embodiments, the allocating unit is arranged to divide remote transceivers into a first group of remote transceivers experiencing relatively high magnitudes of Doppler effect and a second group of remote transceivers experiencing relatively low magnitudes of Doppler effect; and interlace sub-carriers allocated to remote transceivers in said first group with sub-carriers allocated to remote transceivers in said second group.

The power controller may be arranged to estimate from said information about magnitudes of Doppler effect a level of inter-carrier interference experienced by each remote transceiver; estimate from said estimated levels of inter-carrier interference a signal-to-noise ratio for each remote transceiver; and update said power level transmitted to each remote transceiver in dependence of said estimated signal-to-noise ratios. In this case, the power controller may be arranged to update power levels by increasing the power level transmitted to remote transceivers for which said estimated signal-to-noise ratio is below a predefined reference value.

In some embodiments, the circuitry for providing information about magnitudes of Doppler effect is arranged to estimate said magnitudes from digital data symbols received from said remote transceivers. When the Doppler magnitudes are estimated in the transceiver transmitting the digital data symbols, there is no need for this information to be transmitted from the remote transceivers. This principle makes use of the fact that the relative speed between the two transceivers is reciprocal, although the channel might not be, because the uplink and downlink transmissions might be on different frequencies. Alternatively, the circuitry for providing information about magnitudes of Doppler effect may be arranged to receive said information from said remote transceivers.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
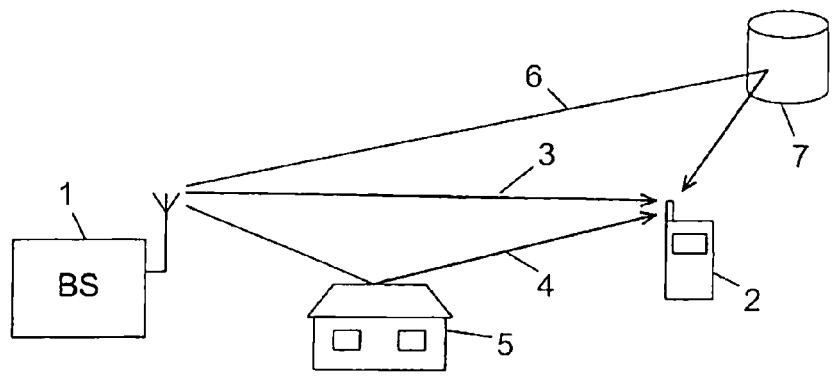
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7. Together these paths define the channel from the base station 1 to the mobile station 2.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays.

Figure 2:
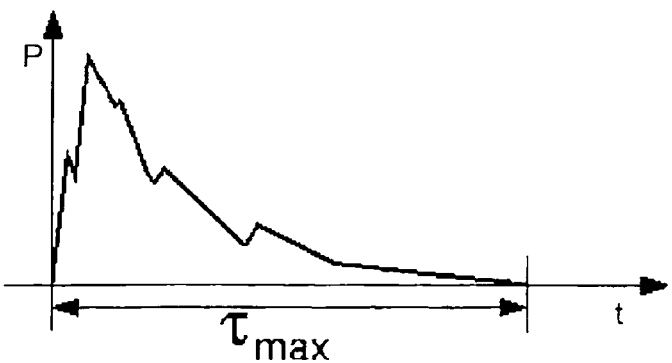
FIG. 2 shows an example of a power delay profile for a channel having multiple paths.

Thus, if a signal is transmitted from the base station 1, the power P received at the mobile station 2 as a function of the time t may look as illustrated in FIG. 2, which shows an example of a power delay profile corresponding to the channel impulse response (cir) of the multipath channel from the base station to the mobile station. In FIG. 2, $\tau_{max}$ indicates the delay spread between the longest path and the shortest path of the channel. This delay spread causes problems to the transmission if it is too large compared to the symbol rate of the transmitted data, because different symbols will interfere with each other, so that inter symbol interference (ISI) occurs. With high data rates several hundreds of symbols may interfere with each other, and the complexity of removing this interference in the receiver will be tremendous.

One way of reducing the symbol rate without reducing the data rate is to use a multi carrier approach, in which the original data stream is multiplexed into a number of parallel data streams with a correspondingly lower symbol rate. Each of these parallel data streams are modulated with a different sub-carrier frequency and the resulting signals are transmitted together in the same band. Typically, a high number of different sub-carrier frequencies, i.e. several hundreds or even thousands, will be needed, and since these frequencies need to be very close to each other, the task of separating them in the receiver will be quite complex unless special precautions are taken, which thus leads to the concept of Orthogonal Frequency Division Multiplexing (OFDM).

Figure 3:
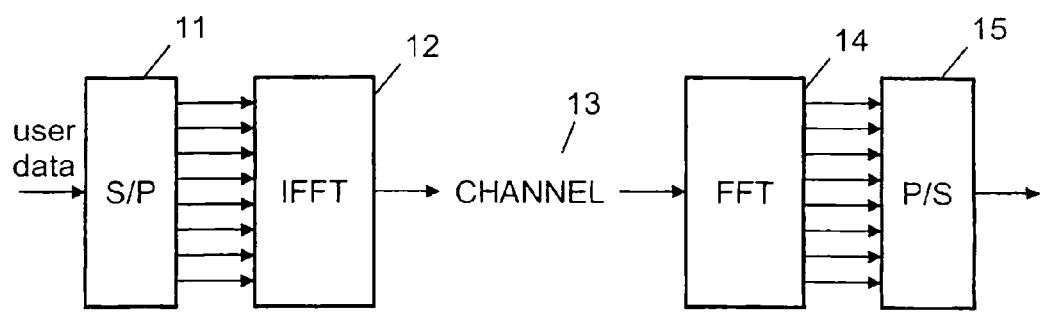
FIG. 3 illustrates the use of Inverse Fast Fourier Transform (IFFT) and Fast Fourier Transform (FFT) blocks in a transmitter and a receiver of an OFDM system.

In OFDM the task of modulation can be performed by a simple Inverse Discrete Fourier Transform that can be implemented efficiently as an Inverse Fast Fourier Transform (IFFT). In the receiver, only a Fast Fourier Transform (FFT) is then needed to reverse the operation. This is illustrated in FIG. 3, in which the user data stream is first multiplexed into a number N of parallel data streams in the serial to parallel converter 11, and the N data streams are then modulated on N sub-carriers using the Inverse Fast Fourier Transform in the IFFT block 12. N is also called the size of the IFFT. The modulation can be in accordance with a number of well-known techniques, such as Quadrature Amplitude Modulation (QAM) or n-ary Phase Shift Keying (n-PSK). The resulting signal comprising all modulated sub-carriers is the baseband signal in the OFDM system, which is then used to modulate a main radio frequency signal. This signal is transmitted via the channel 13 to the receiver side, in which the N data streams are recovered using the Fast Fourier Transform in the FFT block 14 and demultiplexed to the original data stream in the parallel to serial converter 15.

The FFT and the IFFT are essentially defined in the same way. An input sequence $\{X(k)\}=X(0), X(1), \ldots X(N-1)$ is multiplied by a complex frequency $e^{j2\pi\, kn/N}$ for $n=0, 1, \ldots N-1$. There will be N outputs from the IFFT/FFT, each one corresponding to a different n. Thus the IFFT, which represents the N outputs x(n) as a sum of sinusoids, will be defined by the formula $$x(n) = \sum_{k=0}^{N-1} X(k) e^{j\frac{2\pi}{N}nk}.$$

Figure 4:
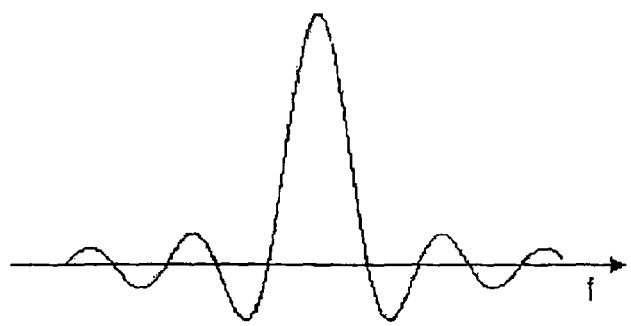
FIG. 4 shows a Fourier transform for a single sub-carrier.
Figure 5:
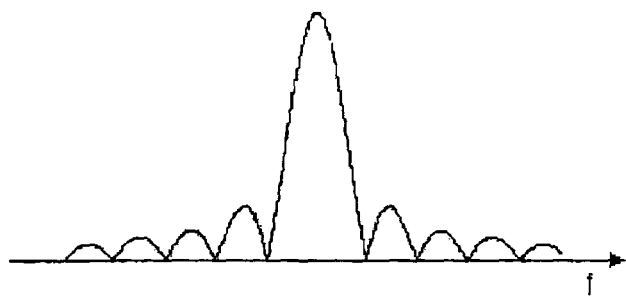
FIG. 5 shows the amplitude spectrum of the Fourier transform of FIG. 4.
Figure 6:
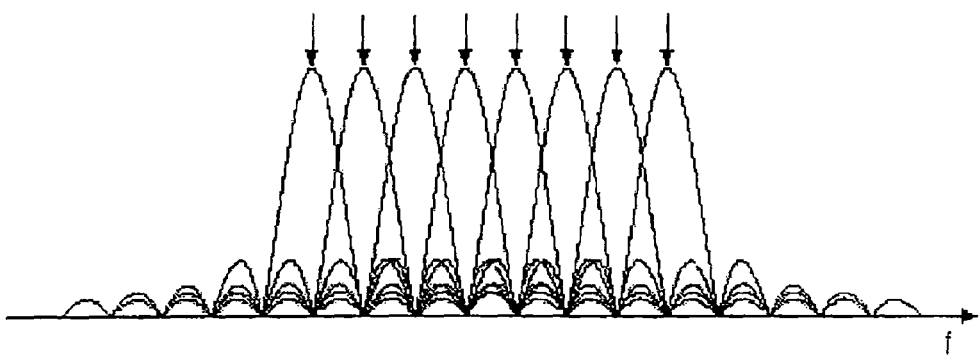
FIG. 6 shows the combined amplitude spectrum for eight orthogonal sub-carriers.

According to the theorems of the Fourier Transform, the rectangular pulse shape, which as mentioned above is chosen for transmission in OFDM, will lead to a sin(x)/x type of spectrum of the sub-carriers. The Fourier transform for one single sub-carrier will thus be as shown in FIG. 4 or, if only the amplitude spectrum of the Fourier transform is considered, as shown in FIG. 5. Obviously, since the different sub-carriers are located close to each other, their spectrums are not separated. They overlap each other. That the information transmitted on the sub-carriers can still be recovered in the receiver is due to the so called orthogonality relation. By using an IFFT for the modulation, the spacing of the sub-carriers is implicitly chosen such that at the frequency where a sub-carrier is evaluated in the receiver all other signals are zero, provided that the orthogonality has been preserved during the transmission. This is illustrated in FIG. 6, which shows the overlapping spectrums for eight sub-carriers. The arrows indicate the frequencies at which each sub-carrier is evaluated in the receiver, and it is seen that at these frequencies the spectrums of the other sub-carriers are all zero.

The reason that the signals modulated by the IFFT are orthogonal is that the vectors exp(j2π kn/N) form an orthogonal basis over the set of N-dimensional complex vectors. For two different values of n, e.g. n' and n", the complex frequency will differ by an integer number of periods. This can be expressed as:

$$\sum_{k=0}^{N-1} (e^{j\frac{2\pi}{N}kn'})(e^{j\frac{2\pi}{N}kn''}) = \sum_{k=0}^{N-1} (e^{j\frac{2\pi}{N}k(n'-n'')}) = 0.$$

The last equality can be derived in several ways. The different terms can be viewed as points on the unit circle and the sum as a center of gravity, which will be the origin. Alternatively, the calculations just have to be performed.

In FIGS. 3 and 6 the IFFT is shown with eight sub-carriers for illustrational purposes. However, in a practical system, the number will be much higher. Thus in systems known today, the size of the IFFT, i.e. the number of sub-carriers, will normally be from 64 to 8192.

Figure 7:
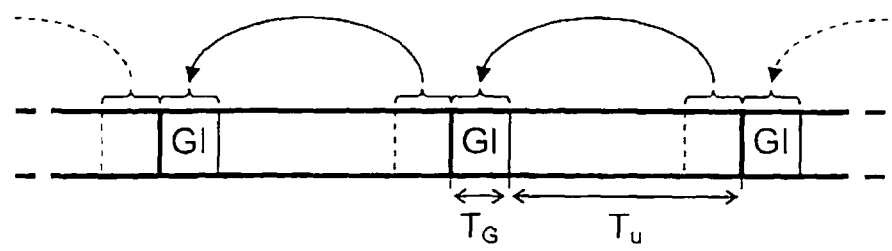
FIG. 7 shows the insertion of a guard interval in each OFDM symbol.

To further reduce the inter symbol interference, the OFDM symbols are artificially prolonged by adding a so-called cyclic prefix (CP), also known as a guard interval (GI), which is done by periodically copying the last part (i.e. the "tail") of each data symbol and then let it precede the symbol as a prefix. This is illustrated in FIG. 7, in which $T_u$ is the length of the useful part of the symbol, while $T_G$ is the length of the guard interval. As long as $T_G$ is longer than the maximum channel delay $\tau_{max}$, all reflections of previous symbols can be removed in the receiver by disregarding the guard interval, and inter symbol interference can thus be avoided.

As mentioned above, the idea of the OFDM system is that due to the orthogonalitly between the sub-carriers, all other sub-carriers will be zero at the frequency where a specific sub-carrier is evaluated in the receiver. It is therefore critical for an OFDM system to work properly that the orthogonality between the sub-carriers is maintained during transmission. If this is not achieved, then the performance is degraded considerably. There are different reasons why orthogonality between the sub-carriers might be lost, e.g., frequency error, time-drift, phase noise, and perhaps most importantly Doppler spread.

When a receiver is moving relative to the transmitter, a Doppler shift corresponding to a frequency error will occur. For a single path channel, the Doppler effect will be a pure Doppler shift frequency error, which cannot be distinguished from a frequency error that is caused by a transmitter and receiver not using exactly the same frequency. In FIG. 6 a pure Doppler shift frequency error would result in the eight frequency spectrums being shifted in frequency relative to the arrows indicating the frequencies at which the sub-carriers are evaluated. The sub-carriers would then no longer be evaluated at their maximum value, and more importantly, the other sub-carriers would no longer be zero at the evaluating frequencies, i.e. the orthogonality is not maintained. However, a pure Doppler shift is relatively easy to estimate and remove, which is not the case for Doppler spread.

Figure 8:
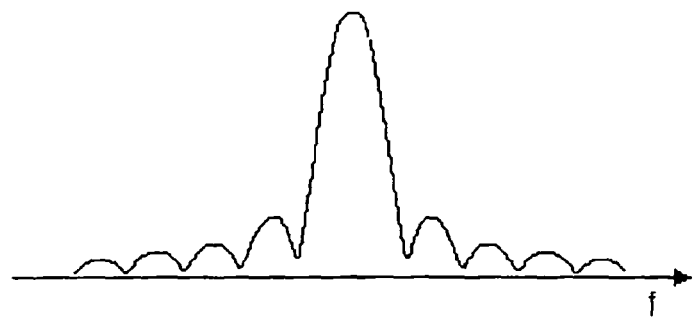
FIG. 8 shows an example of how the spectrum of FIG. 5 may be affected by Doppler spread.
Figure 9:
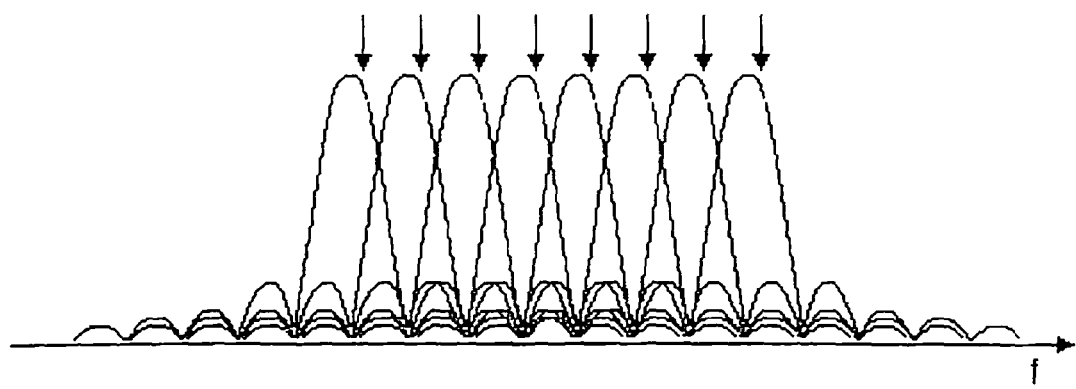
FIG. 9 shows an example of how the spectrum of FIG. 6 may be affected by Doppler shift and Doppler spread.

When a communications channel is characterized by multi-path propagation, different paths will arrive at different angles and by that have different Doppler shifts. The maximum Doppler shift is obtained when the angle of arrival is 0 and π, i.e. when the receiver is moving directly towards or away from the transmitter. The Doppler shift will have a different sign for these two angles, and all Doppler frequencies in-between are possible. This means that different parts of the signal, i.e. parts traveling via different paths, will experience different Doppler shifts. The result is that the spectrums shown in FIG. 6 will not only be shifted in frequency relative to the evaluating arrows as mentioned above, they will also be "blurred". This is illustrated in FIG. 8 for the spectrum of a single sub-carrier and in FIG. 9 for the spectrum of the eight sub-carriers corresponding to FIG. 6, in which it can be seen that the orthogonality is no longer fully maintained. FIG. 9 shows the effects of a Doppler shift (the spectrums are shifted in frequency relative to the arrows indicating the frequencies at which the sub-carriers are evaluated) as well as a Doppler spread (the spectrums are "blurred" as just mentioned).

As mentioned, the size of the FFT/IFFT, i.e. the number of sub-carriers, is based on a trade-off between ability to handle large delay spread and ability of work well at high Doppler levels. When a large FFT is employed, the duration of the useful part of the OFDM symbol, $T_u$, will be large, and therefore a large cyclic prefix can be used without causing too much overhead. On the other hand, since the sub-carrier spacing equals $1/T_u$, this spacing is decreased for large FFT sizes, and therefore the system becomes more sensitive to especially the Doppler effect. The problem with the Doppler effect is mainly due to inter-carrier interference (ICI). This means that information from one sub-carrier leaks over to the neighboring sub-carriers, as it is also illustrated in FIG. 9. The effect of ICI is essentially that the interference will cause a noise-floor.

When OFDM is used for multiple-access, i.e. the sub-carriers are shared between a number of users, as will be the case e.g. in a mobile telephone system when signals are transmitted between a base station and a number of mobile terminals, the channels to the different users may have very different characteristics regarding channel impulse response, Doppler effect, etc. Thus the users may be very differently affected by the Doppler effect, so that some users might have poor performance due to high Doppler levels in spite of a large signal-to-noise ratio (SNR). However, the above-mentioned trade-off between the ability to handle delay spread and the Doppler effect cannot be made user-by-user, because the size of the IFFT/FFT is of course common for all users and must be selected for the "worst case" situation when many users are present.

Below a solution is described that reduces the effect of Doppler spread in an OFDM system. The solution is based on the fact that different users will typically move at very different speeds, and that it will therefore also vary considerably how much they suffer from ICI. Since ICI is caused by the fact that a user is moving relatively fast, it is easy to determine which users suffer from ICI and which do not. By using this knowledge when allocating the sub-carriers to the different users, it is possible to exploit power control much more efficiently than would have been the case if the different users would have been allocated continuous sets of sub-carriers.

The described solution relates to the situation where OFDM is employed and the used sub-carriers are shared between two or more users. Especially, the solution suggests taking into consideration the fact that when the signal is sent from the base station to the different users, the users might experience very different Doppler effects. Effectively, this has the effect that users moving fast will experience more ICI than users traveling at lower speeds. Since the ICI experienced on one particular frequency bin is caused by leakage from the closest sub-carriers, this means that if the users are allocated consecutive sub-carriers (bins in the FFT), increasing the output power has virtually no effect on ICI. In the present disclosure, it is therefore suggested to allocate the sub-carriers to the different users in such a way that also the different levels of Doppler effect experienced by the different users is considered. Specifically, a method is disclosed wherein sub-carriers carrying information for users with high Doppler levels are interlaced with sub-carriers carrying information to users with low Doppler levels. Since the major cause for ICI to a specific sub-carrier comes from the closest sub-carriers, this allows for power control to be used as an effective means to counteract the ICI. The disclosed method can be viewed as a flexible means to distribute the totally generated ICI between users in such a way that the system performance is improved.

To ease the description of the disclosed method, it is initially supposed that only two users are transmitting over the channel, where one of the users is moving at high speed whereas the other one is essentially standing still.

Figure 10:
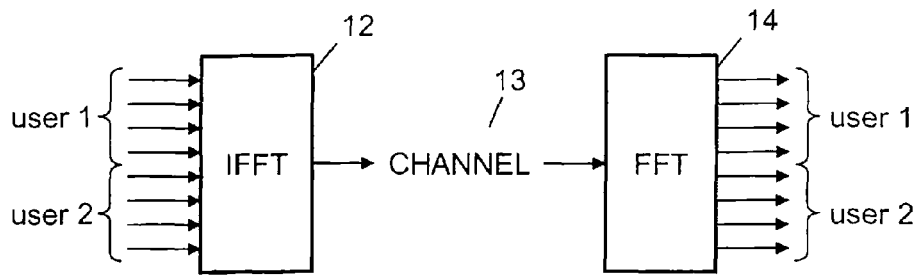
FIG. 10 shows an example of allocation of sub-carriers to two users according to prior art.

One approach for dividing the available sub-carriers between the users would be to assign the upper half of the frequencies to user 1 and the lower half to user 2 as illustrated in FIG. 10. The spectrum received at user 1, who is moving at high speed, would then look like that of FIG. 9, however with only the four leftmost sub-carrier frequencies being evaluated, while the spectrum received at user 2, who is standing still, would look like that of FIG. 6, however with only the four rightmost sub-carrier frequencies being evaluated. It is thus seen that the orthogonality is maintained for user 2, but not for user 1. This way of dividing the available spectrum among the users is considered prior art.

Figure 13:
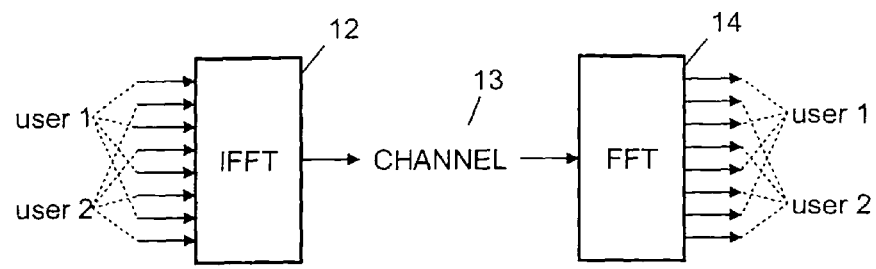
FIG. 13 shows a different example of allocation of sub-carriers to two users.

In the current disclosure, it is suggested to instead divide the sub-carriers so that every second sub-carrier is used by user 1 and the remaining sub-carriers are used by user 2, as illustrated in FIG. 13. Again the received spectrums will be like those of FIGS. 9 and 6, respectively, but now every second sub-carrier frequency will be evaluated in the receivers. It is clear that in the case where the orthogonality between the sub-carriers is maintained, as it is the case for user 2, the performance for the two solutions would be similar. However, as it will be described below, this is not the case for user 1, where the orthogonality is not maintained, because power control can make a difference.

Figure 16:
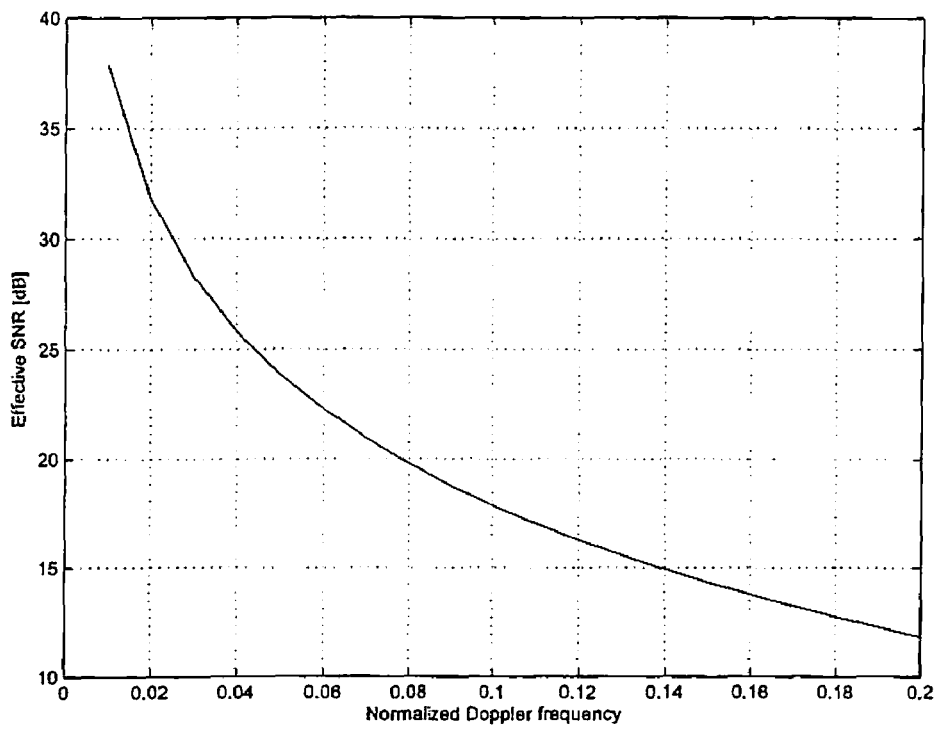
FIG. 16 shows effective signal-to-noise ratio as a function of normalized Doppler frequency.

The level of ICI and thus the signal-to-noise ratio can be calculated as follows. For simplicity, it is supposed that both users would like to use 64-QAM as the modulation technique and that this requires e.g. 25 dB in effective SNR, i.e., the SNR that is experienced by the receiver. To simplify things, it is supposed that the thermal noise can be neglected, so that the performance for the two users is only limited by the ICI. It can be shown that, under conditions that are often fulfilled, the effective SNR equals $$SNR = \frac{6}{\pi^2 f_D^2}, \qquad (1)$$

where $f_D$ is the normalized Doppler frequency, i.e., the Doppler frequency divided by the sub-carrier spacing. FIG. 16 shows the effective SNR as a function of the normalized Doppler frequency. The above formula for the SNR follows immediately from the fact that if the power of the desired signal is normalized to unity, the level of ICI equals $$I = \frac{\pi^2}{6} f_D^2. \qquad (2)$$

It can further be supposed that user 1 is traveling at rather high speed, e.g. corresponding to a normalized Doppler frequency of $f_D=0.06$, whereas the second user is standing still, i.e. $f_D=0$.

Figure 11:
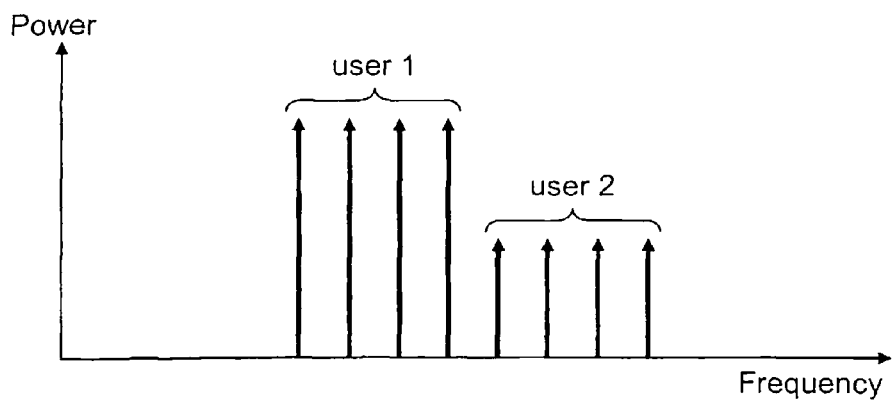
FIG. 11 shows the use of power control for sub-carriers allocated according to FIG. 10.
Figure 12:
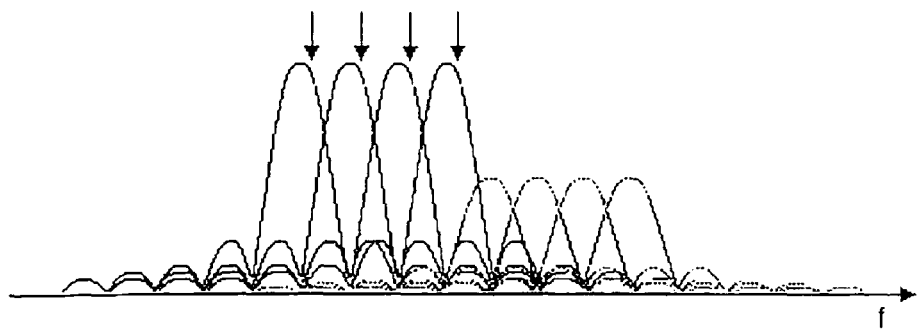
FIG. 12 shows received spectrums corresponding to FIG. 11.

In case the total bandwidth then is divided according to prior art, i.e. the sub-carriers are divided between the two users as shown in FIG. 10, this means that user 1 will experience a SNR of about 22 dB, and consequently will not be able to receive 64-QAM since the assumption was that 25 dB was required. User 2, on the other hand, will easily be able to receive 64-QAM since there is no Doppler effect that limits the performance. It can be noted that the low SNR for user 1 is almost entirely due to ICI caused by himself (only a very small number of sub-carriers close to the sub-carriers used by user 2 are affected by user 2). Henceforth the interference the user is causing himself is denoted self-interference, and the issue with self-interference is that it is proportional to the power of the desired signal thereby making power control useless. FIG. 11 illustrates that the power level of the sub-carriers assigned to user 1 is adjusted to a higher level than the power level of sub-carriers assigned to user 2, and FIG. 12 shows the spectrums received at user 1, where it is easily seen that due to self-interference power control does not increase the SNR experienced at user 1.

Next, the proposed approach, where every second sub-carrier is used by the two users, is considered. In case the data is sent to the two users at the same power level, the situation is the same as above in that user 1 will not be able to receive 64-QAM whereas user 2 will. The difference here is that the major source of ICI for user 1 is caused by user 2, thus suggesting that in fact power control might be a feasible solution. It can be shown that the interference to user 1 for the proposed access scheme is accurately estimated by $$I_1 = f_D^2 \pi^2 \left( \frac{P_1}{24} + \frac{P_2}{8} \right), \tag{3}$$

where $P_1$ and $P_2$ are the powers for user 1 and user 2, respectively. Referring to equation (3), it is readily seen that in case the users are transmitting at equal power, the interference level will be the same as in equation (2). However, since the SNR for user 1 can be written $$SNR_1 = \frac{P_1}{I_1} = \frac{1}{f_D^2 \pi^2} \cdot \frac{P_1}{\frac{P_1}{24} + \frac{P_2}{8}} = \frac{1}{f_D^2 \pi^2} \cdot \frac{1}{\frac{1}{24} + \frac{P_2}{8P_1}}, \tag{4}$$

it is also seen that by making $P_1 \gg P_2$, it is possible to reduce the interference experienced by user 2 by a factor of 4 (6 dB). Specifically, if $P_2 = P_1/3$, then $I_1$ is decreased by 3 dB so that user 1 in fact will have a SNR of 25 dB thereby making 64-QAM feasible. Clearly, the possibility of solving the ICI problem is due to the two users not using adjacent sub-carriers.

Figure 14:
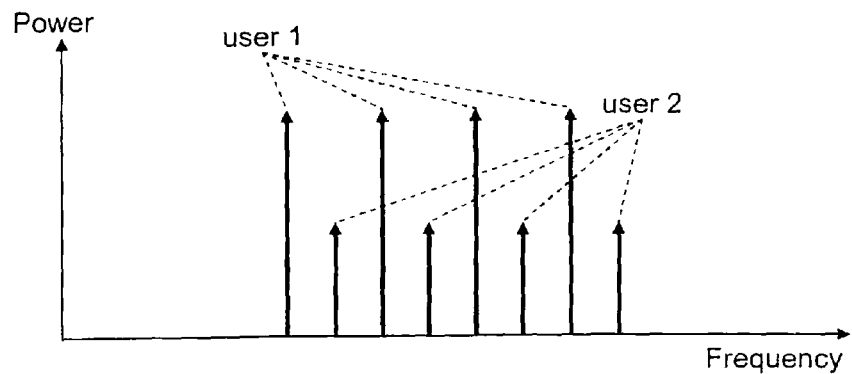
FIG. 14 shows the use of power control for sub-carriers allocated according to FIG. 13.
Figure 15:
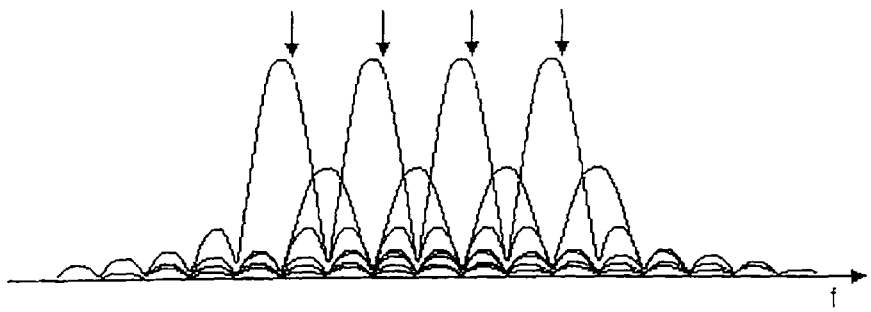
FIG. 15 shows received spectrums corresponding to FIG. 14.

FIG. 14 illustrates that every other sub-carrier is used by the two users, and that the power level of the sub-carriers assigned to user 1 is adjusted to a higher level than the power level of sub-carriers assigned to user 2. FIG. 15 shows the spectrums received at user 1, where it is easily seen that power control can increase the SNR experienced at user 1, since the power level of the sub-carriers closest to each of the sub-carriers used by user 1 is adjusted to a lower level.

In the description above it was assumed that signals were transmitted over the channel to only two users, i.e. one moving at high speed and one essentially standing still. A more general case will now be considered, for which the following definitions are introduced:

$N_{FFT}$ is the number of used sub-carriers (which usually is somewhat smaller than the FFT size).

$N_u$ is the number of users simultaneously accessing the channel (in total using $\leq N_{FFT}$ sub-carriers).

$$SNR_n = \frac{S_n}{N_n + I_n}$$

is the signal-to-noise-ratio experienced for user n, where $S_n$ is the power of the desired signal, $N_n$ is the power of the thermal noise, and $I_n$ is the interference caused by Doppler spread.

Since the OFDM system in the ideal case will ensure that the different frequencies are orthogonal, one might choose to use power control just to compensate for the different path losses, or one might transmit all users with the same power and in that way making the system more robust to imperfections that leads to loss of orthogonality between the sub-carriers.

Often when considering the effect of ICI, the total ICI caused by all sub-carriers is discussed. This is found by summing over all sub-carriers, and the result is (again assuming unit power):

$$I^{(1)} = f_D^2 \sum_{k=1}^{\infty} \frac{1}{k^2} = \frac{\pi^2}{6} f_D^2, \tag{5}$$

where the summation index k corresponds to the distance (in number of frequency bins), and $f_D$ is the normalized Doppler frequency. The superscript (1) is used to denote the distance in bins between the used sub-carriers.

In case a user only transmits on every second frequency bin, this means that the self-interference can be written:

$$I^{(2)} = f_D^2 \sum_{k=1}^{\infty} \frac{1}{(2k)^2} = \frac{1}{4} f_D^2 \sum_{k=1}^{\infty} \frac{1}{k^2} = \frac{1}{4} I^{(1)}. \tag{6}$$

In a similar fashion, for a user being allocated to every m'th bin it follows that $$I^{(m)} = \frac{1}{m^2} I^{(1)}. \tag{7}$$

Figure 17:
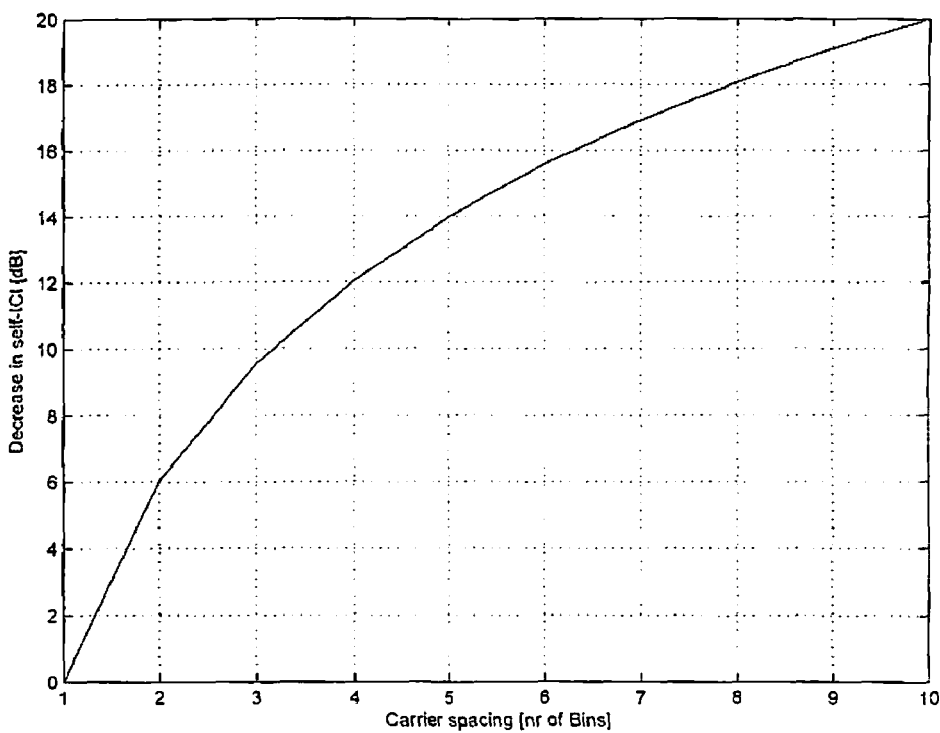
FIG. 17 shows self-interference as a function of the distance between allocated bins.

The self-interference as a function of the distance between the used bins is shown in FIG. 17, from which it is seen how the self interference is reduced by allocating bins further apart. Thus, referring to the equations above (or to FIG. 17), it is possible to improve the performance for an isolated user by not allocating adjacent sub-carriers, but instead allocating sub-carriers with a certain distance from one another.

Concerning the (average) interference from one user to another, it might in the general case not be easily described as above, i.e., as a factor times $I^{(l)}$. In spite of this, it is straightforward to determine by simply considering the total interference (from all bins used) caused by user n on all bins on user k. Below, $I^{(k;\, n)}$ denotes this interference in case both users were transmitting with the same power. ($I^{(k;\, n)}$ can be viewed as a "leakage coefficient" and the effect the leakage has on the performance will also depend on the (relative) power of the two users).

Since the total number of available frequencies, if possible, should be used, it is important that the sub-carriers in between can be used by the other users without totally ruining the total efficiency of the system.

Figure 18:
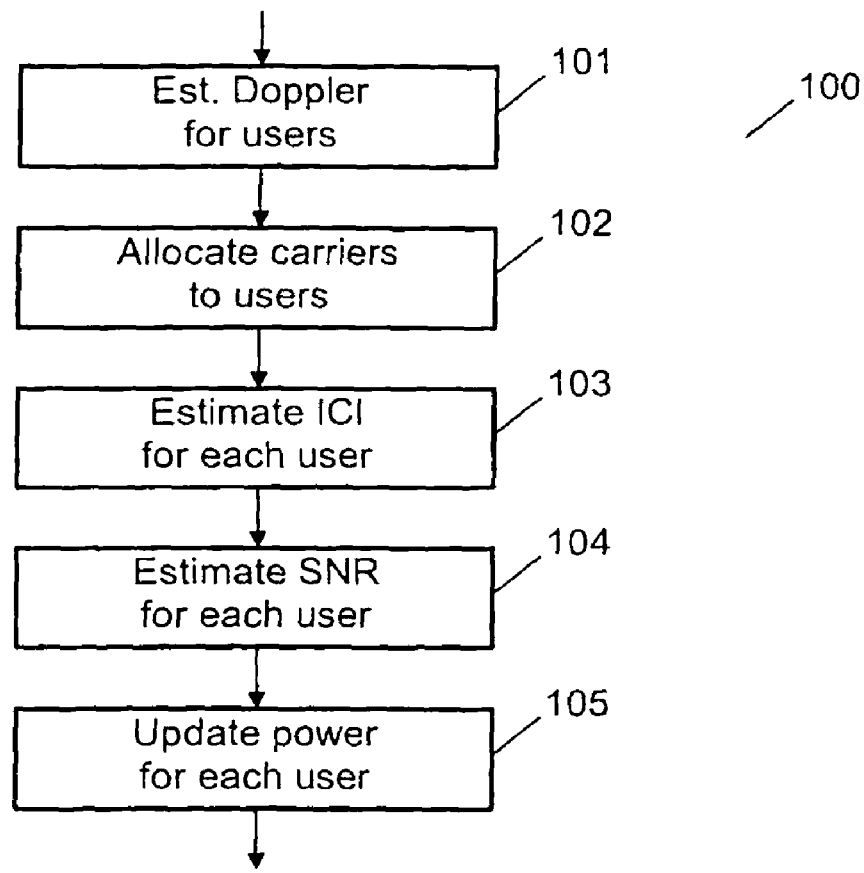
FIG. 18 shows a flow chart of a method of allocating carriers and controlling power in dependence of estimated Doppler effect.

One algorithm for achieving this (which for simplicity neglects the noise term) is described below and illustrated in the flow chart 100 of FIG. 18.

1. Having estimated in step 101 the Doppler effect experienced by each user, sub-carriers are allocated to the different users in step 102, starting with the one having the highest Doppler level, then taking the user with the second highest Doppler level and so on, until all sub-carriers have been allocated to all users. To allow for efficient use of power control, the self-interference, as described above, should be made sufficiently small by using sub-carriers sufficiently far apart for every user.

2. For each one of the users, the experienced ICI is estimated in step 103 as $$I_k = f_{D,k}^2 \sum_{n=1}^{N} P_n I^{(k,n)},$$

where $I^{(k;\,n)}$ denotes the leakage coefficient as defined above from user n to user k.

3. For each one of the users, an estimate of the experienced SNR is obtained in step 104 as $$SNR_k = \frac{P_k}{I_k}.$$

4. Based on $SNR_k$ and $I_k$ for the different users, $P_k$ is updated in step 105 for the different users to give as good performance as possible. The criteria might for instance be the total data rate for the $N_u$ users accessing the channel, or it might be that as many as possible of the users should have access to the channel.

Figure 19:
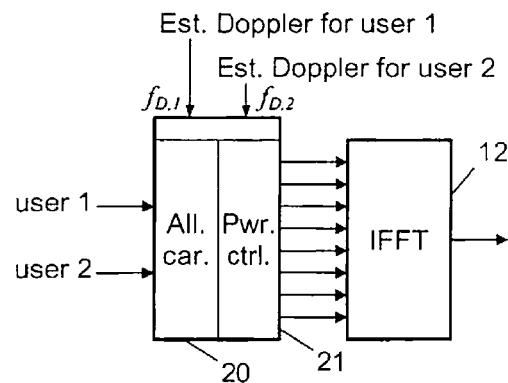
FIG. 19 shows how data signals from two users are allocated and power controlled in dependence of estimated Doppler effect.

FIG. 19 shows how the data signals from user 1 and user 2, respectively, are allocated to the sub-carriers and the power of the signals adjusted in dependence of the estimated Doppler frequency $f_{D,1}$ and $f_{D,2}$ for the two users in the allocating unit 20 and the power controller 21, in the situation where data from only two users are transmitted.

Based on the estimated Doppler effect for different users, it is calculated how much ICI each user experiences from the other user(s). For users that experience too much ICI, due to high Doppler levels or because the other users are too strong, the distance between sub-carriers is increased to reduce ICI from other users, or alternatively the power is increased. For users that are moving slowly, it is checked if the ICI level might be increased to aid the other users. If so, the power for the other users might be increased without ruining the performance for the slowly moving user. The algorithm is performed to obtain the best performance possible, e.g., in terms of total throughput or minimum delay for the users. The Doppler effect experienced by the users may be estimated at the transmitter side and provided directly to the allocating unit 20, or it may be estimated in the remote receivers, and the corresponding information transmitted back to the transmitter, where it is provided to the allocating unit 20.

Regarding the above algorithm, the following remarks can be made. Several approaches might be adopted concerning how the sub-carriers are allocated. For instance:

The sub-carriers for each user can be separated as much as possible, i.e. the user's sub-carriers are spread over the entire bandwidth to minimize the self interference.

The sub-carriers for each user can be separated as much as needed to ensure that the self interference is sufficiently attenuated, but not more.

The users can be divided into "High Doppler effect users" and "Low Doppler effect users", and then the two categories can be interlaced to ensure that the power control algorithm can be made efficient.

It might be that not all users can get access to the channel, e.g. due to too many users experiencing too high Doppler levels. Then, the allocation of sub-carriers might change from one OFDM symbol to the next, so that not all users are transmitting information in every symbol, but effectively time division is employed between the users.

Concerning how the SNR is estimated for the different users, this might easily be extended to also include the effect of other disturbances, e.g. noise. The effect of the other disturbances may then effectively be included in the noise term $N_k$ for user k as follows:

$$SNR_k = \frac{P_k}{I_k + N_k}.$$

Figure 20:
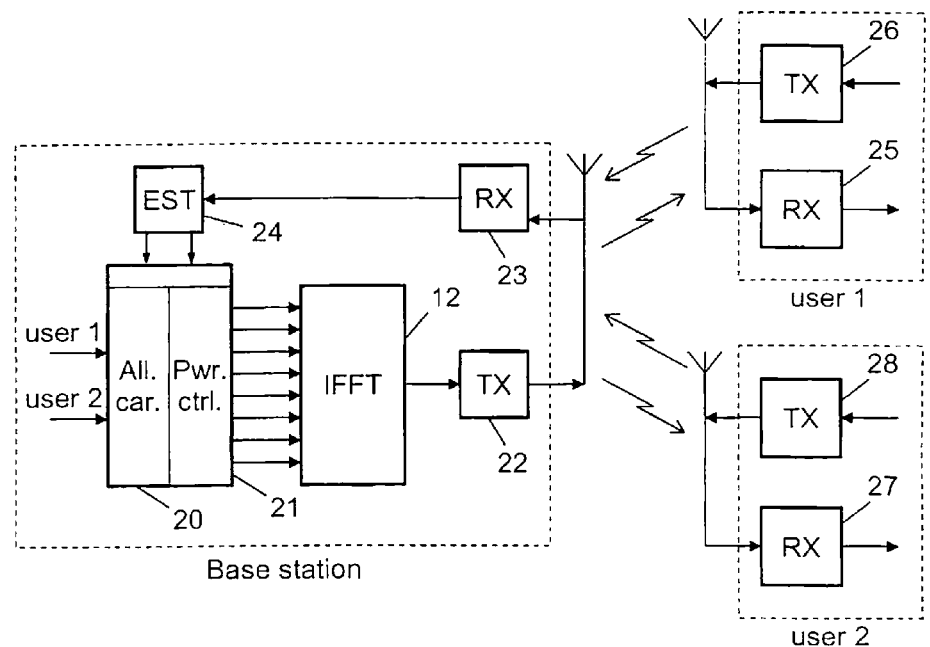
FIG. 20 shows how the Doppler effect can be estimated in the base station.

As mentioned above, the Doppler effect experienced by the different users may be estimated at the base station based on the uplink transmission from the users. This is illustrated in FIG. 20, in which the downlink signals provided by the IFFT 12 are transmitted from the transmitter 22 of the base station to the receivers 25 and 27 of user 1 and user 2, respectively, while the uplink signals from the transmitters 26 and 28 of user 1 and user 2 are received in the receiver 23 of the base station. In the Doppler estimator 24 the Doppler levels for the two users are estimated based on the received uplink signals and then used in the allocating unit 20 and the power controller 21 as representative of the Doppler levels experienced by the users for the downlink transmission. In this way there is no need for information about the experienced Doppler levels to be transmitted from the mobile stations to the base station. This makes use of the fact that the relative speed between the two transceivers is reciprocal, although the channel might not be reciprocal because the uplink and downlink transmissions might be on different frequencies.

Figure 21:
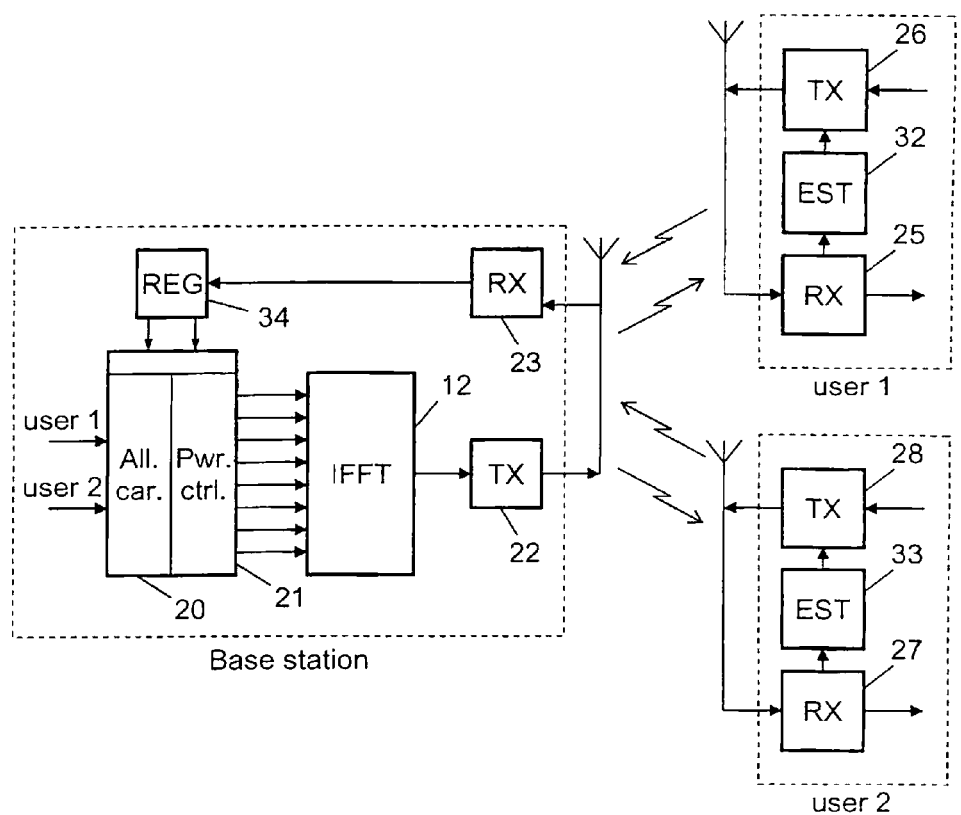
FIG. 21 shows how the Doppler effect can be estimated in the mobile stations.

Alternatively, a Doppler estimator may be arranged in each of the mobile stations to estimate the experienced Doppler levels in the downlink transmission. This is illustrated in FIG. 21, in which the Doppler estimators 32 and 33 estimate the Doppler levels experienced by user 1 and user 2, respectively. Information about the estimated Doppler levels can then be transmitted to the base station via the transmitters 26 and 28 and the receiver 23. The information about the Doppler levels for the different users can then be stored in a register 34 and used in the allocating unit 20 and the power controller 21.

The Doppler spread might be estimated in several ways. An approach that is commonly used is to consider how often the received signal passes a certain level. This can for instance be done by first estimating the average received power, and then count how often the received power falls below this average. The number of times per second that this happens is in proportion to the Doppler spread. An alternative way is to consider, e.g., the real part of the channel (the channel is complex valued), and estimate how many times per second the real part goes from being positive to being negative, i.e., crosses the imaginary axis in the complex plane. For an OFDM system, this might be done by using the pilot symbols that are transmitted on some of the sub-carriers.

The described solution provides flexibility in the sub-carrier allocation in the down-link. The allocated sub-carriers for a certain user are separated more the higher the estimated Doppler effect for that particular user. Based on the required sub-carrier spacing, also time-division may be included for the users to ensure that a sufficient sub-carrier spacing can be obtained (for the users with high Doppler levels). The different sub-carriers in an OFDM multiple access system are allocated at least partly based on the Doppler effect for the different users. This allows for an effective means to use power control to mitigate ICI. The disclosed methods can be viewed as a means to distribute ICI somewhat evenly between the users, in spite of the fact that the users are experiencing very different Doppler levels.

Although various embodiments of the present invention have been described and shown, the invention is not restricted to it, but may also be embodied in other ways within the scope of the subject-matter defined in the following claims.

The invention claimed is:

1. A method of transmitting digital data symbols from a transceiver to at least two remote transceivers in a wireless communications system, said transmission employing Orthogonal Frequency Division Multiplexing, wherein a number of available sub-carriers are shared between said remote transceivers, comprising the steps of:
providing information about magnitudes of Doppler effect experienced by said remote transceivers;
allocating sub-carriers to each remote transceiver in dependence of said information about magnitudes of Doppler effect; and
controlling a power level transmitted to each of said remote transceivers in dependence of said information about magnitudes of Doppler effect, wherein the controlling further comprises
estimating from said information about magnitudes of Doppler effect a level of inter-carrier interference experienced by each remote transceiver,
estimating from said estimated levels of inter-carrier interference a signal-to-noise ratio for each remote transceiver, and
updating said power level transmitted to each remote transceiver in dependence of said estimated signal-to-noise ratios.

2. The method according to claim 1, wherein the step of allocating sub-carriers comprises the step of separating at least sub-carriers allocated to a remote transceiver for which a relatively high magnitude of Doppler effect is experienced by at least one sub-carrier allocated to a remote transceiver for which a lower magnitude of Doppler effect is experienced.

3. The method according to claim 1, wherein the step of allocating sub-carriers comprises the steps of:
allocating sub-carriers to the remote transceiver for which the highest magnitude of Doppler effect is experienced;
allocating sub-carriers to the remote transceiver for which the second highest magnitude of Doppler effect is experienced; and
allocating repeatedly sub-carriers to the remote transceiver for which the next highest magnitude of Doppler effect is experienced, until all sub-carriers have been allocated.

4. The method according to claim 1, wherein the step of allocating sub-carriers comprises the step of separating sub-carriers for each remote transceiver as much as possible.

5. The method according to claim 1, wherein the step of allocating sub-carriers comprises the step of separating sub-carriers for each remote transceiver to an extent where an amount of self interference for that receiver is kept below a predefined limit.

6. The method according to claim 1, wherein the step of updating power levels comprises the step of increasing the power level transmitted to remote transceivers for which said estimated signal-to-noise ratio is below a predefined reference value.

7. The method according to claim 1, wherein the step of providing information about magnitudes of Doppler effect comprises the step of estimating in the transceiver said magnitudes from digital data symbols received from said remote transceivers.

8. The method according to claim 1, wherein the step of providing information about magnitudes of Doppler effect comprises the step of receiving said information from said remote transceivers.

9. A method of transmitting digital data symbols from a transceiver to at least two remote transceivers in a wireless communications system, said transmission employing Orthogonal Frequency Division Multiplexing, wherein a number of available sub-carriers are shared between said remote transceivers, comprising the steps of:
providing information about magnitudes of Doppler effect experienced by said remote transceivers;
allocating sub-carriers to each remote transceiver in dependence of said information about magnitudes of Doppler effect, wherein the allocating further comprises
dividing remote transceivers into a first group of remote transceivers experiencing relatively high magnitudes of Doppler effect and a second group of remote transceivers experiencing relatively low magnitudes of Doppler effect, and
interlacing sub-carriers allocated to remote transceivers in said first group with sub-carriers allocated to remote transceivers in said second group; and
controlling a power-level transmitted to each of said remote transceivers in dependence of said information about magnitudes of Doppler effect.

10. A transceiver for transmitting digital data symbols to at least two remote transceivers in a wireless communications systems, said transceiver employing Orthogonal Frequency Division Multiplexing, wherein a number of available sub-carriers are shared between said remote transceivers, the transceiver comprising:
circuitry for providing information about magnitudes of Doppler effect experienced by said remote transceivers;
an allocating unit for allocating sub-carriers to each remote transceiver in dependence of said information about magnitudes of Doppler effect; and
a power controller for controlling a power level transmitted to each of said remote transceivers in dependence of said information about magnitudes of Doppler effect, wherein the power controller is arranged to
estimate from said information about magnitudes of Doppler effect a level of inter-carrier interference experienced by each remote transceiver,
estimate from said estimated levels of inter-carrier interference a signal-to-noise ratio for each remote transceiver, and
update said power level transmitted to each remote transceiver in dependence of said estimated signal-to-noise ratios.

11. The transceiver according to claim 10, wherein the allocating unit is arranged to separate at least sub-carriers allocated to a remote transceiver for which a relatively high magnitude of Doppler effect is experienced by at least one sub-carrier allocated to a remote transceiver for which a lower magnitude of Doppler effect is experienced.

12. The transceiver according to claim 10, wherein the allocating unit is arranged to:
allocate sub-carriers to the remote transceiver for which the highest magnitude of Doppler effect is experienced;
allocate sub-carriers to the remote transceiver for which the second highest magnitude of Doppler effect is experienced; and allocate repeatedly sub-carriers to the remote transceiver for which the next highest magnitude of Doppler effect is experienced, until all subcarriers have been allocated.

13. The transceiver according to claim 10, wherein the allocating unit is arranged to separate subcarriers for each remote transceiver as much as possible.

14. The transceiver according to claim 10, wherein the allocating unit is arranged to separate subcarriers for each remote transceiver to an extent where an amount of self interference for that receiver is kept below a predefined limit.

15. The transceiver according to claim 10, wherein the power controller is arranged to update power levels by increasing the power level transmitted to remote transceivers for which said estimated signal-to-noise ratio is below a predefined reference value.

16. The transceiver according to claim 10, wherein the circuitry for providing information about magnitudes of Doppler effect is arranged to estimate said magnitudes from digital data symbols received from said remote transceivers.

17. The transceiver according to claim 10, wherein the circuitry for providing information about magnitudes of Doppler effect is arranged to receive said information from said remote transceivers.

18. A transceiver for transmitting digital data symbols to at least two remote transceivers in a wireless communications systems, said transceiver employing Orthogonal Frequency Division Multiplexing, wherein a number of available sub-carriers are shared between said remote transceivers, the transceiver comprising:
  circuitry for providing information about magnitudes of Doppler effect experienced by said remote transceivers;
  an allocating unit for allocating sub-carriers to each remote transceiver in dependence of said information about magnitudes of Doppler effect, wherein the allocating unit is arranged to:
    divide remote transceivers into a first group of remote transceivers experiencing relatively high magnitudes of Doppler effect and a second group of remote transceivers experiencing relatively low magnitudes of Doppler effect, and
    interlace sub-carriers allocated to remote transceivers in said first group with sub-carriers allocated to remote transceivers in said second group;
  a power controller for controlling a power level transmitted to each of said remote transceivers in dependence of said information about magnitudes of Doppler effect.

* * * * *

UNITED STATES PATENT AND TRADEMARK OFFICE
CERTIFICATE OF CORRECTION

| | | |
|---|---|---|
| PATENT NO. | : 8,050,338 B2 | Page 1 of 1 |
| APPLICATION NO. | : 11/915445 | |
| DATED | : November 1, 2011 | |
| INVENTOR(S) | : Wilhelmsson | |

It is certified that error appears in the above-identified patent and that said Letters Patent is hereby corrected as shown below:

In Column 2, Line 48, delete "me" and insert -- be --, therefor.

In Column 12, Line 50, delete "$I^{(1)}$." and insert -- $I^{(1)}$. --, therefor.

Signed and Sealed this
Fourteenth Day of February, 2012

David J. Kappos
*Director of the United States Patent and Trademark Office*